United States Patent Office 3,733,371
Patented May 15, 1973

3,733,371
IRIDESCENT COMPOSITION AND METHOD
OF ITS PREPARATION
Akira Kose, Koganei, and Yoko Kobayashi, Fujisawa, Japan, assignors to Zaidan-Hojin Oyo Kogaku Kenkyujo, Tokyo, Japan
No Drawing. Filed Feb. 5, 1971, Ser. No. 113,039
Claims priority, application Japan, Mar. 31, 1970, 45/26,845
Int. Cl. C08f 19/08, 15/00, 19/00
U.S. Cl. 260—880 R    10 Claims

ABSTRACT OF THE DISCLOSURE

A stabilized light reflecting iridescent polymeric material is provided. The new material comprises a three dimensional closely packed regularly arranged structure of uniform polymeric microspheres. The microspheres are obtained from a film forming polymeric latex and have a particle diameter in the range from 1,000 to 4,500 A. The polymeric structure is stabilized by surrounding the microspheres with a polymeric material having no measurable solubilizing effect on the microspheres and having a refractive index differing from that of the microspheres in absolute value to the extent of up to 0.1 to provide optical discontinuity.

BACKGROUND OF THE INVENTION

According to an article by J. W. Vanderhoff et al., Journal of the Optical Society of America, vol. 44, pp. 603–609 (1954), when monodispersed polyvinyltoluene latices, having a diameter range from about 100 to 1,000 m$\mu$, are dried to form a frail film, the particles of the latex spontaneously arrange themselves in a close-packed crystalline array.

The resulting film is characterized by an iridescent surface color. The crystalline samples show beautiful iridescent effects under the illumination of white light. Unfortunately, iridescent films produced in this manner are too fragile for practical use. If the films are heat treated their mechanical strength is considerably improved, but there is a marked decrease in diffracting power. Heat treated samples are more transparent than untreated samples. As the samples become clearer the diffracting power is weaker and after prolonged heat treatment the final film is a transparent and non-diffracting material.

Thus, heretofore, there has been no practical way of providing a stabilized three dimensional close-packed iridescent structure. The known iridescent films are too fragile for practical use in decoration or for ornamental effects and, if such films are heat stabilized, they lose their pronounced iridescent characteristics. We have succeeded in providing a stabilized iridescent structure which has practical utility in decoration and ornamentation.

SUMMARY OF THE INVENTION

According to the present invention a three dimensional closely packed regularly arranged structure of uniform polymeric microspheres is provided. The microspheres originate from a film-forming latex and are characterized by a particle diameter in the range of 1,000 to 4,500 A. The structure is stabilized by surrounding the microspheres with polymeric materials which have no measurable solubilizing effect on the microspheres and which have a refractive index differing from that of the microspheres in absolute value to the extent of up to one-tenth to provide optical discontinuity.

The new stabilized light reflecting iridescent polymeric material is made by maintaining a film-forming polymeric latex in a quiescent state until iridescence is observed. At this point the particles of the latex become closely packed and regularly arranged. The latex consists of substantially uniform particles having an average particle diameter in the range of 1,000 to 4,500 A. and a water content of up to 50 to 80% by weight.

Water is removed from the compacted latex while maintaining it in a quiescent state. Water removal is continued until the water content is reduced to less than 20% by weight. To the partially dehydrated latex is added a water miscible inert organic liquid to remove residual water from the compacted latex. The particles of the compacted latex are then surrounded with a polymerizable material which has no measurable solubilizing effect on the microspheres and which has a refractive index differing from that of the particles in absolute value up to the extent of one-tenth to provide optical discontinuity in the final product.

The material surrounding the particles is polymerized to form a light reflecting polymeric material exhibiting intense color caused by optical interference phenomena.

DETAILED DESCRIPTION

The iridescent material of the invention is made by a process involving following five steps:

(1) Quiescent standing, which results in formation of a three dimensional close-packed structure of regular array;

(2) Drying, whereby a semi-stabilization of the iridescent structure is obtained;

(3) Dehydration, whereby residual water is removed by an inert water miscible organic liquid;

(4) Substitution, whereby the liquid used for the dehydration is replaced either directly by a polymerizable material having appropriate properties of refractive index and compatibility or indirectly by a non-volatile liquid and then by a polymerizable material; and (5) Polymerization, whereby the monomer surrounding the three dimensional close-packed structure is polymerized by conventional means to stabilize the iridescent structure.

SYNTHETIC LATEX SELECTION

Synthetic latices, which are suspensions of ultramicrospheres of synthetic high polymers, have been widely used for treating textiles, paper, cement, adhesives and so forth. Specially prepared polystyrene latices having a highly uniform particle size are conventionally used as a standard for magnification calibration of the electron microscope. Many kinds of high polymer synthetic latices are commercially available, typical among these being polystyrene, styrene-butadiene copolymers, methyl methacrylate-acrylate ester copolymers, acrylonitrile-butadiene copolymers, vinyl chloride-vinyl acetate copolymers, vinylidene chloride-vinyl chloride copolymers, styrene-divinyl benzene copolymers, methyl methacrylate-divinyl benzene copolymers, and so forth. It is known that the particle size of the microspheres of these latices range between about 500 and 10,000 A. in diameter.

The particular synthetic latices useful in the present invention are characterized by film forming properties when dried below 60° C.; in other words, the minimum film-forming temperature of these latices is below 60° C. When dried below 60° C. the particles of such film-forming latices coalesce and form on a substrate a transparent or semi-transparent film which can be peeled intact from the substrate. A non-film forming latex when so dried forms only a white powdery or chalky mass with no mechanical strength.

The film forming properties of the latex are dependent on the properties of the particular polymer used and, in the case of copolymers, on the percentage of the various monomers making up the copolymer and the specific combination of monomers making up the copolymer. For example, neither polystyrene nor polymethyl methacrylate has film forming properties when dried below 60° C. In contrast therewith, both polyethyl acrylate and polyvinyl acetate have film-forming properties, and a 40% by weight ethyl acrylate: 60% by weight methyl methacrylate copolymer has film forming properties. However, a combination of 20% by weight ethyl acrylate and 80% by weight methyl methacrylate copolymer does not have such properties, and copolymers consisting of styrene and butadiene have such properties depending on the weight ratio of the monomers in the composition. On the other hand copolymers consisting of styrene and divinyl benzene do not have the properties regardless of the ratio of the constituents. The film-forming properties of the latex are also dependent upon other physical conditions of the latex, e.g., surface tension of the latex, particle size of the latex, relative humidity of the atmosphere under which latex is dried, and the plastization of polymer particles of the latex. Thus, the film-forming properties should be defined by the minimum film-forming temperature of the latex measured prior to the practical use by means of some proper technique, such as the method according to an article by T. F. Protzman and G. L. Brown, Journal of the Applied Polymer Science, vol. 4, pp. 81–85 (1960) to determine whether the latex is useful in the present invention.

Typical polymers and copolymers which form filmforming latices include syrene-butadiene copolymers (styrene/butadiene: 70–25/30–75% by weight), acrylonitrile-butadiene copolymers (acrylonitrile, butadiene: 40–25/60–75% by weight, methyl methacrylate-butadiene copolymers, polyethyl acrylate, polybutyl acrylate, ethyl acrylate-methyl methacrylate copolymers, butyl acrylate-methyl methacrylate copolymers, styrene-ethyl acrylate copolymers, styrene-butyl acrylate copolymers, polyvinyl acetate, polyvinyl pyridine, vinyl acetate-vinyl chloride copolymers, vinylidene chloride-vinyl chloride copolymers, vinyl acetate-butyl acrylate copolymers and so forth.

The useful size range of latex particles for purposes of the invention is between 1,000 and 4,500 A. in diameter. The size distribution of the latex should be such that 80% of the mass of particles has a particle size within ±10% of the average particle size of the entire mass.

From the point of view of preparing a prefectly regular close packed array of particles in a three dimensional structure, the size distribution should be as narrow as possible; ideally the deviation in particle size should be zero. Because it is impossible to prepare a latex of perfect uniformity some variation in particle size must be tolerated; a reasonable one being if 80% of the mass of particles has a particle size within ±10% of the average particle size of the mass. We found that good irridescent effects cannot be achieved if the size distribution is less uniform than such variation; the resulting structure becomes irregular and the iridescent effects produced are markedly decreased.

Highly regular arrangement of latex particles, however, can also be obtained from a latex having less uniformity in particle size by controlling the conditions under which the closely packed three dimensional structure is obtained. In this case, the important factors are the stability of the latex, the concentration of the latex particles, the rate at which water is removed from the latex and the temperature. By controlling these conditions a uniformity in three dimensional structure occurs because the larger particles tend to segregate from the smaller ones at the time of formation of the three dimensional structure. This segregation effect is characterized by an upper layer within the three dimensional structure consisting of smaller particles and a lower layer consisting of larger particles. The formation of the three dimensional structure takes more time compared with the time required to form such a structure from a latex having a highly uniform particle size. Because of time requirements it is the best to use a latex having the highest possible degree of particle size uniformity. If the particle size distribution deviates considerably from the 80% uniformity it is not possible to form a regular three dimensional structure and accordingly no iridescent effect is produced.

The latices used in the present invention are made by conventional emulsion polymerization. If the resulting latex suspension prepared by conventional means does not satisfy the required conditions of particle size and uniformity, conventional methods such as hydraulic elutriation or centrifugal separation can be used in order to provide a latex having the necessary physical characteristics.

QUIESCENT PARTICLE ARRANGEMENT

According to the above mentioned article in the Journal of the Optical Society of America, when a latex suspension is placed in a glass container and allowed to stand quietly for several hours or is coated on a glass plate and dried down slowly, the latex particles spontaneously arrange themselves in a regular close-packed array. Suspensions or dried films reveal beautiful iridescent colors at the container-suspension and air-suspension interface or on the surface of the film. We have found that the formation of such a structure is greatly affected by the colloidal stability and the particle concentration of the latex suspension.

The formation of a structure having a regular array from the particle suspension is due to the colloidal interaction between the particles. Such interaction is dependent on the colloidal stability of the suspension and on the particle concentration. Generally speaking, more uniform closely packed three dimensional structures can be formed from a latex suspension having a higher degree of colloidal stability and higher particle concentration.

According to the invention the stability of the suspension can be easily determined either by direct measurement of the ionic concentration or by the quantity of a polyvalent ionic standard solution that can be added to the suspension without coagulation. Ionic concentration can be measured directly by means of electric conductivity. From the standpoint of forming a highly regular iridescent structure, the lower the ionic concentration the better the result. Preferably the ionic concentration should be less than about $3 \times 10^{-3}$ mol/l. or preferably $3 \times 10^{-4}$ mol/l. when measured as KCl. From the standpoint of producing an iridescent color effect, the stability of the latex suspension must be correlated with the particle concentration when the particle concentration is low; that is, for example, if the particle concentration is between 10 and 20% by weight the ionic concentration must be correspondingly low in order to produce iridescence. The lower the particle concentration of the suspension, the lower the ionic concentration must be in order to produce iridescence.

The problem of ionic concentration can be offset to some extent by adding a high polymer protective colloid or a surfactant to maintain the collodial stability of the suspension. Suspension stability can be determined by a standard stabilization test involving the addition of a standard 0.5% by weight aqueous solution of $CaCl_2$. Suspensions to which can be added at least 5 cc. of $CaCl_2$ standard solution per 100 ml. of suspension without coagulation are useful in the present invention. The degree of coagulation is determined by observing the sample under an ultramicroscope. Provided that the proper relationship exists between the ionic concentration and the concentration of the particles in the latex suspension, the concentration of particles is not particularly critical; however, at very low concentrations care must be taken during subsequent drying to maintain the proper relationship between ionic concentration and particle concentration. Preferably according to the invention the starting particle concentration should be in the range of 20 to 50% by weight in order to achieve the regular array of three dimensional closely packed particles upon subsequent drying.

In order to control the conditions of colloidal stability and particle concentration for the formation of the highly regular array of three dimensional closely packed particles, conventional methods can be used, namely, dialysis, deionization using ion exchange resins, further addition of stabilizer, concentration by evaporation of water, centrifugal separation and the like.

The colloidal stability of the suspension must be carefully maintained until the water content is decreased below 20% by weight.

DRYING OF THE SUSPENSION

A suspension having the required conditions of particle concentration and colloidal stability is placed in a suitable container and allowed to stand quietly. The suspension is dried by slow evaporation of the water. As drying proceeds an iridescent region begins to appear and flecks showing pronounced iridescent color become observable at the interface of the container and the suspension and at the air-suspension interface. This phenomenon indicates that the particles in the suspension have become arranged in a regular three dimensional close-packed structure. The resulting arrangement can be classified as a face-centered cubic close-packed structure. The iridescent region at the interface is considered to be the (111) face of the structure orienting parallel to the interface. The color changes of the iridescent structure are dependent upon the size of the spherical particles making up the structure, the angle of the incident beam of light, and the average refractive indices of the constituent materials of the structure. The underlying principle of this iridescent phenomena can be attributed to Bragg's reflection caused by regular arrangement.

The correlation between observed color and particle size and incident beam angle and refractive index of the constituent materials are as follows:

$$2na \sin \theta = m\lambda \quad (1)$$

$$a = \sqrt{\frac{2}{3}} d \quad (2)$$

$$n = xn_1 + yn_2 \quad (3)$$

In the above formulas $n$ denotes the average refractive index of the constituent materials; $n_1$ denotes the refractive index of a particle; $n_2$, the refractive index of the void filling material; $a$, the lattice distance (in this case "$a$" denotes the lattice distance of the (111) plane of a face centered cubic structure); $\theta$, the angle of the incident beam; $m$, the order of interference (a positive integer, 1, 2, 3 . . . ); $\lambda$, the wave length; $d$, the particle diameter in angstrom units; $x$, the ratio of the specific volume of spherical particles in the structure; and $y$, the ratio of the specific volume of void filling material in the structure, respectively.

Evaporation or drying in the quiescent state is terminated at the point at which the water content of the suspension is decreased within the range of 1 to 20% by weight. As the water evaporates from the suspension the suspension becomes thicker and thicker. At the point where the water content of the suspension is decreased to below to about 20% the suspension changes to a gel-like or elastic material depending on its water content. The suspension reveals an iridescent effect in its surface layer and is opaque in appearance. As the drying of the material proceeds further transparency is increased and the iridescent effect becomes weaker. Finally the material changes into a transparent elastic material displaying no iridescent effect. This phenomenon is characteristic of synthetic latices having film-forming properties below 60° C. such as those described hereabove. It cannot be observed in non-film forming latices, such as those made from styrene-divinyl benzene copolymers, methyl methacrylate-divinyl benzene copolymers and the like.

The regular array structure of the gel-like or elastic material is considered to be in a state of semi-stability. It is too unstable to withstand mechanical stress or ambient changes occurring during practical use, but it is sufficiently stable to be processed further according to the invention. If a non-film-forming latex is used in lieu of a film-forming latex, the resultant dried material cannot withstand the subsequent processing steps of organic liquid substitution immersion and so forth. Such a material disperses into individual particles or breaks down into tiny fragments, thus losing its iridescent effect.

The phenomena occurring in the suspension during drying are believed to be as follows: while the water content of the suspension is in the range of from about 50 to 80%, the particles are suspended in the surrounding medium without contacting each other through the force of colloidal interaction and thus they arrange themselves into a structure having a regular array. On further decrease of the water content, the particles become more concentrated and, at about 20% water content, the particles come into contact and partially coalesce with each other, thus forcing out water and dispersants, such as surfactants or protective colloids, by means of the force generated by the surface tension of the surrounding aqueous medium. Thus the structure achieves a semi-stabilized state. At this stage water and the dispersant within the voids of the structure are considered to form an independent network throughout the structure.

Further evaporation causes deformation of particles, resulting in an increase in contact area and a corresponding decrease of the specific volume of water and dispersant network throughout the structure. At the final stage particles further deform and come into perfect contact with each other, occluding dispersants. At the beginning of this stage, however, the particles maintain their individual identity and subsequently this identity becomes lost by solubilization of the dispersants into particles and, accordingly, the particles coalesce perfectly with each other and the whole structure becomes homogeneous, losing its optical discontinuity. Upon loss of optical discontinuity the material changes into a transparent elastic material displaying no iridescent effect.

From the foregoing description it becomes readily apparent that the water content of the partially dried material is an important factor relating to (1) maintaining the individual identity of the particles within the structure, (2) the degree of coalescence of the particles ($x$ in Equation 3), and (3) the occupied specific volume of the voids in the structure ($y$ in Equation 3). The individual identity of the particles governs the optical discontinuity within the structure, and the degree of the coalescence of the particles and the occupied specific volume of the voids throughout the structure affect the relative ease of water-organic liquid substitution, the color of the iridescence displayed by the structure and the transparency of the composition. Accordingly, the drying step must be terminated at the point where the water content of the gel-like structure or elastic material is reduced to within the range of 1 to 20% by weight.

DEHYDRATION

The dried material having a water content below 20% is immersed in a water miscible organic liquid having no measurable solubilizing effect on the compacted particles. Suitable liquids include lower aliphatic alcohols, such as methyl, ethyl, n-propyl, isopropyl, n-butyl, isobutyl, sec-butyl, t-butyl, primary amyl, and secondary amyl alcohols; polyhydric alcohols, such as ethyleneglycol, propyleneglycol, and glycerin; aliphatic ketones, such as acetone and methylethyl ketone; and alcohol ethers, such as methyl Cellosolve, Cellosolve, Carbitol, diethyleneglycol, triethyleneglycol, dioxane and so forth.

As a practical matter, the choice of the organic liquid can vary widely, but the liquid must be water miscible and have no measurable solubilizing effect on the compacted particles.

After the dried material is immersed in a suitable liquid, with the passage of time the material gradually becomes opaque from its edges and the dominant iridescent color (the color observed vertically when the material is illuminated vertically as used herein) shifts to a longer wavelength. This shift indicates that the water in voids of the structure has been replaced by the organic liquid without destroying the regular arrangement of the structure.

During immersion the dried material sometime swells, depending upon the particular choice of immersion liquid and the material; however the swelling can be tolerated provided that the liquid does not destroy the regular array of the particles.

REPLACEMENT OF THE IMMERSION LIQUID

The immersion liquid within the regular polymeric structure is displaced according to the invention either directly with a polymerizable material used to surround the particles and stabilize the structure or indirectly by first replacing the water-miscible organic liquid with an inert non-volatile organic liquid, coating the particles with an oil resistant film and subsequently surrounding the compacted coated particles with a polymerizable material.

The material selected to replace the immersion liquid must not have any measurable solubilizing effect on the compacted microspheric particles comprising the iridescent structure. Any measurable solubilizing effect will result in the destruction of the iridescent structure. With respect to the replacement material it must have a refractive index differing from that of the polymeric structure in absolute value up to the extent of 0.1 to provide optical discontinuity in the final product.

In the case where the immersion liquid is directly replaced with polymerizable monomer the conditions with respect to refractive index must be fulfilled upon completion of polymerization. The difference in refractive index between the compacted structure and the surrounding polymerized material is expressed according to the following relationship:

$$0.1 \geq |n_1 - n_2| > 0, \tag{4}$$

wherein $n_1$ denotes the refractive index of three dimensional close-packed regularly arrayed structure and $n_2$ denotes the average refractive index of the polymeric material used to fill the voids.

From the standpoint of selecting a suitable monomer, the monomer should have no measurable solubilizing effect on the iridescent structure. Also, the shift of the refractive index caused by polymerization must be considered. The refractive index difference between the iridescent structure constituent material and the void filling material is one of the most important factors affecting the dominant reflecting color and the transparency of the final iridescent composition. We have found that both iridescent effects and transparency of the composition are superior when the refractive index difference between the microspheres and surrounding void filling material is equal to or less than 0.1 in absolute value and of course, is greater than zero. If the refractive index difference is greater than 0.1 in absolute value, iridescent sparkle will be found on the surface of the composition; however, the opacity of the composition is considerably increased so that illuminated light does not penetrate deeply to the composition and accordingly, the iridescent effect is drastically decreased. On the other hand if the refractive index difference is equal to zero the material simply becomes transparent and, because of the lack of optical discontinuity, there is no iridescent effect.

In general, as far as practical use is concerned, the requirements for transparency, dominant iridescent color and type of iridescent effects are somewhat subjective. The combination of these properties depends upon the intended use and upon the preference of the user. The difference in refractive index is extremely important with respect to controlling these requirements. The required refractive index variation can be produced either by the proper choice of a single material to replace the immersion liquid or, if this is not satisfactory, the choice of a mixture of materials wherein the mixed materials have a refractive index differing from each other.

Suitable monomers to be used to replace the immersion liquid include styrene, methylstyrene, dimethylstyrene, ethylstyrene, diethylstyrene, divinylbenzene, monochlorostyrene, monochloromethyl styrene, monochlorodimethylstyrene, dichlorostyrene, dichloromonomethylstyrene, monobromostyrene, dibromostyrene, dimethylmaleate, diethyl maleate, methyl acrylate, ethyl acrylate, n-propyl acrylate, n-butyl acrylate, n-amyl acrylate, allyl acrylate, methyl methacrylate, ethyl methacrylate, allyl methacrylate, n-propyl methacrylate, isopropyl methacrylate, n-butyl methacrylate, n-amyl methacrylate, vinyl acetate, allyl acetate, diallyl phthalate, diallyl adipate, diallyl sebacate, diallyl maleate, unsaturated polyesters combined with styrene or methyl methacrylate monomers and so forth.

If the immersion liquid is to be replaced by a non-volatile organic liquid prior to final stabilization using a polymerizable monomer, the following liquids are recommended: i.e. dialkyl phthalates in which the alkyl group has up to eight carbon atoms, such as dimethyl phthalate, diethyl phthalate, dibutyl phthalate, and dioctyl phthalate; tributyl phosphate, tricresyl phosphate, dibutyl adipate, dibutyl sebacate, glycerol triacetate, saturated polyesters, and so forth.

When the compacted iridescent structure is immersed either in polymerizable monomer or non-volatile organic liquid, the structure becomes more transparent and the iridescent color shifts to that of a longer wavelength because of the change in refractive index and also because of the change in volume of the constituent spheres caused by swelling.

One characteristic feature of the gel-like or elastic material made by drying film-forming latices is that it is possible to control the particle diameter and the refractive index of the particles without destroying the iridescent structure by means of swelling produced by the immersion of the material in a suitable liquid. In other words, it is possible to control the iridescent effect in the product by changing the particle diameter (related to $d$ in Equation 2) and the refractive index of the particles (related to $n_1$ in Equation 3) by means of solvent swelling of the particles.

One of the great practical advantages of the swelling caused either by the replacement polymerizable monomers or non-volatile liquids is the fact that the original particle diameter of the microsphere in the film-forming latex can be smaller than that which would fulfill the condition of Bragg's reflection of visible light. In order to make a latex having larger particle size by emulsion polymerization, the reaction is conducted for a longer period of time, which unfortunately causes undesirable variations in particle size uniformity due to subsequent nucleations. In general, therefore, the smaller the particles of the latex, the higher the degree of uniformity and correspondingly the larger the particle size the lesser the degree of uniformity.

As noted above the uniformity of particle size has a pronounced effect on the formation of a regularly compacted array structure. The highly regular array structure may form from small particles, which are too small to fulfill Bragg's condition, but which have a much higher degree of uniformity, and can reveal Bragg's reflection of visible light when the particles become larger because of the swelling caused by the replacement polymerizable liquid or non-volatile organic liquid. In addition to the changes in particle size, the swelling of the particles results in a change in the refractive index of the particles because of the change in composition of the particle constituent materials (related to $n_1$ in Equation 3). As noted above it is possible to control the iridescent effect in the product as desired by controlling both particle size diameter ($d$) and the refractive index of the particle ($n_1$) by means of swelling.

After any swelling that occurs has ceased, the monomers surrounding the compacted iridescent structure are polymerized by conventional means using a free radical catalyst, such as benzoyl peroxide, acetyl peroxide, methylethyl ketone peroxide, azobisisobutyronitrile, and so forth. After polymerization a solid and stable iridescent composition is obtained.

On the other hand, if a non-volatile liquid rather than a polymerizable monomer is first used to replace the immersion liquid, such iridescent material (after swelling has ceased), is separated by decantation and then allowing the non-volatile liquid to drain off and is subsequently coated by dipping in an aqueous solution of a water-soluble high polymer having low permeability, in other words no miscibility in the non-volatile liquid. Such water soluble high polymers include gelatin, polyvinyl alcohol, arginic acid, gum arabic, agar-agar, carboxymethyl cellulose, soluble starch, casein and so forth.

Treatment with such a polymer temporarily stabilizes the iridescent composition by forming, during drying, an oil resistant film on its surface. The thus treated iridescent material is incorporated within polymerizable monomers, such as methyl methacrylate monomer, styrene monomer, unsaturated polyester and, thereafter, the entire composition is permanently stabilized by polymerization using conventional means.

The iridescent composition produced according to the invention displays beautiful and varied iridescent flecks which change color depending upon the angle of the observation. Furthermore, because of the transparency of the composition, incident light can penetrate into the deeper portion of the structure so that the reflections from another plane, such as the (220) plane can be observed, thus providing unexpectedly beautiful iridescent effects.

Our invention is further illustrated by the following examples.

EXAMPLE 1

A styrene-butadiene suspension, having particles of a high degree of uniformity (greater than 80%) with an average particle diameter of about 2,600 A., was placed in a glass container and allowed to stand quietly at room temperature. After iridescent color becomes observable at the container and suspension interface, water was slowly evaporated from the suspension. Evaporation was discontinued after the water content of the suspension was reduced to about 10% by weight. The resulting material was elastic in nature, slightly transparent, and green iridescent flakes appeared on its surface. After immersing this material in ethylene glycol the dominant iridescent color shifted to that of slightly longer wavelength. After the material had been uniformly impregnated with ethylene glycol portions of it were dipped in a mixture of 75 parts methyl methacrylate and 25 parts diallyl phthalate (by volume). After passage of time the iridescent material began to swell around its edges. The transparency of the material was increased and the dominant iridescent color shifted further to that of longer wavelength. The monomer-treated material continued to change in volume and iridescent color for a period of time ranging from several minutes to up to a few days depending on the volume of the iridescent material. After the change in color and volume ceased the resulting material had the physical nature of frail gel that must be handled with great care. To the gel was added 1% by weight of benzoyl peroxide and the material was polymerized at 70° C. The product thus obtained showed slight opacity but was generally transparent. Under the illumination of white light pale yellowish-green flakes could be seen. The product has beautiful and pronounced iridescent effect when it is cast directly into jewelry or incorporated into methyl methacrylate or other synthetic resins to provide iridescent cast articles.

EXAMPLE 2

Dried iridescent material made from a suspension of highly uniform particle size as described in Example 1 was allowed to reach the state of quiescence and water was evaporated as described in Example 1. The resulting material was treated with ethylene glycol and after removing excess ethylene glycol the material was dipped in a mixture of 50 parts methyl methacrylate monomer and 50 parts diallyl phthalate. Less swelling was observed than in the case of Example 1; however, the dominant color of reflection shifted to that of longer wavelength, and the material had a higher degree of transparency when compared with that of Example 1. To the resulting material was added 1% of benzoyl peroxide and polymerization was carried out at 80° C. The iridescent composition thus produced has sufficient mechanical stability to make it useful from a practical point of view. The product is pleasing in appearance from a standpoint of both transparency and iridescent effect.

EXAMPLE 3

The procedure of Example 1 was repeated and a material having elastic properties and a dominant green iridescent color was obtained. Thus material was immersed in a mixture of 10 parts methyl methacrylate monomer and 90 parts diallyl phthalate. 1% benzoyl peroxide was added and the material was polymerized at 80° C. The resulting product was almost transparent; however, dispersed throughout were green, blue and red iridescent flecks.

EXAMPLE 4

The procedure of Example 1 was repeated with the exception that a mixture of 73 parts methyl methacrylate, 25 parts diallyl phthalate and 2 parts 1/16 nitrocellulose by weight was substituted for the polymeric mixture used in Example 1. To the mixture of monomers and iridescent substance was added 0.5% benzoyl peroxide and polymerization was carried out at 80° C. The product showed almost same iridescent effects as that of the product obtained in Example 1.

EXAMPLE 5

The procedure of Example 1 was repeated with the exception that a mixture of 70 parts of methyl methacrylate, 25 parts diallyl phthalate and 5 parts dibutyl phthalate was substituted for the polymerizable mixture used in Example 1. To the mixture of monomers and iridescent material was added a free radical catalyst and polymerization was carried out using the conditions of Example 1. The product showed almost the same iridescent effects and transparency as those of the product obtained in Example 1.

EXAMPLE 6

The procedure of Example 1 was repeated with the exception that a pure methyl methacrylate monomer was substituted for the mixture of Examples 1, 2 and 3. 0.5% benzoyl peroxide was added to the mixture of monomer and iridescent substance, and polymerization was carried out at 80° C. The resulting product was less transparent than those of foregoing examples but the iridescent effect was more pronounced. The material contained throughout its body a mixture of blue and green iridescent colors.

EXAMPLE 7

A suspension of styrene-butadiene copolymer spheres having a solids content of 48% by weight and particles of a substantially uniform diameter of 2,000 A. was placed in a glass container and dried slowly under a controlled evaporation rate at 50° C. Evaporation was discontinued when the water content of the suspension was reduced to 15%. The resultant product was somewhat gummy in nature and contained violet flecks. When the product was immersed in ethylene glycol the dominant color of interference shifted to that of a longer wavelength. After immersion, excess ethylene-glycol was removed and the iridescent substance was dipped in a mixture of 50 parts methyl methacrylate monomer and 50 parts diallyl phthalate, containing 1% by weight of benzoyl peroxide. The material, after a period of time, became swollen, increased in transparency and the wavelength of reflecting color shifted to that of a longer wavelength. When these changes ceased the temperature of the mixture was raised to 80° C. and polymerization was carried out by the standard method. The resulting product had good transparency and pleasing iridescent effects.

EXAMPLE 8

The procedure of Example 7 was followed with the exception that ethyl alcohol was used in lieu of ethylene glycol. More time was required for the replacement of water using ethyl alcohol than when using ethylene glycol as in Example 7. The period of dipping in the methyl methacrylate and diallyl phthalate monomer mixture required more time than that of Example 7. However, the transparency and iridescent effects of the composition were both outstanding.

EXAMPLE 9

The procedure of Example 7 was repeated substituting butyl alcohol in lieu of ethylene glycol. Other conditions of the experiment remained unchanged. The resulting product had good transparency and pleasing iridescent effects.

EXAMPLE 10

Iridescent material, dehydrated and treated with ethylene glycol according to Example 7, was prepared. Ethylene glycol was removed from the material and voids between the particles were filled by dipping in a 50:50 mixture of diphenyl chloride and dibutyl adipate. The resulting material was elastic in nature, exhibited good transparency and contained various iridescent flecks. After removing excess mixed solvent from the material it was dipped in a 2% aqueous solution of gelatin. Excess solution was allowed to drain for few minutes and the resulting product was dried for several minutes after which a thin gelatinous film formed on its surface. By repeating this procedure several times a thicker and stronger film was obtained. The iridescent material coated with the gelatinous film was incorporated into various synthetic resins, including polymethyl methacrylate, polystyrene and unsaturated polyesters or their monomers. Molded and casted articles showed strong and beautiful iridescent effects.

EXAMPLE 11

An acrylonitrile-butadiene copolymer latex having a uniform particle diameter of about 2,400 A. was allowed to stand quietly in a glass container. After iridescence became observable water was removed slowly by evaporation until the water content was reduced to 10% by weight. The resulting transparent elastic material was immersed in iso-propyl alcohol and was then incorporated in a mixture of styrene and diallyl phthalate monomer. Polymerization was carried out at 80° C. by conventional means using 1% benzoyl peroxide. The product thus obtained had pleasing iridescent effects.

EXAMPLE 12

An iridescent material was obtained by drying an acrylonitrile-butyl acrylate copolymer latex having a uniform particle size of about 2,200 A. in diameter according to the preceding examples. After removal of the remaining water in the voids of the structure by dipping it in iso-propyl alcohol, the material was immersed in a mixture of diallyl phthalate, dibutyl phthalate and methyl methacrylate monomer, and polymerization was carried out by conventional means. The product thus obtained had pleasing ornamental effects.

EXAMPLE 13

A vinylidene chloride-vinyl chloride copolymer latex was used in obtaining partially dried iridescent material according to the preceding examples. The material was dehydrated by dipping it in acetone and it was then incorporated in a mixture of methyl methacrylate, ethyl hydroxyethyl cellulose and diallyl phthalate, and polymerization was carried out as in the previous examples. The product obtained has outstanding iridescent effects.

EXAMPLE 14

A vinyl chloride-vinyl acetate copolymer latex having a uniform particle diameter of about 1,800 A. was placed in a glass container and allowed to stand in a quiescent state at room temperature. After an iridescent color was observable at the interface of the glass container and latex suspension, water was removed by slow evaporation. Drying was discontinued after the water content of the suspension was reduced to about 1% by weight. The resulting material was then immersed in butyl alcohol to remove residual water. After dehydration of the material it was incorporated into an unsaturated polyester, styrene monomer and dioctyl phthalate mixture. After changes in the iridescent color and the transparency of the material ceased polymerization was carried out as in the previous examples. The product was pleasing in iridescent effects.

EXAMPLE 15

A vinyl acetate-butyl acrylate copolymer latex was used in preparing partially dried iridescent material according to the preceding examples. After dehydration of the material by dipping it in ethyl alcohol, the material was incorporated into a mixture of diallyl phthalate and methylmethacrylate monomer and polymerization was carried out by conventional means. The product thus obtained is useful for ornamentation because of its pleasing iridescent effects.

EXAMPLE 16

A dehydrated iridescent material was prepared according to the procedure of the preceding examples from a polyvinyl acetate latex suspension having a substantially uniform particle diameter of about 3,000 A. The material was then incorporated in a mixture of methacrylate monomer, diallyl phthalate and nitrocellulose, and the polymerization was carried out by conventional means. The iridescent material thus produced had satisfying iridescent effects.

EXAMPLE 17

A dehydrated iridescent material was obtained by immersing partially dried styrene-butyl acrylate copolymer latex, having a uniform particle diameter of about 2,600 A. and a water content of less than 20% by weight, in ethyl alcohol. After changes in iridescent color and volume generated from dipping it in a mixture of diallyl phthalate and methyl methacrylate monomer ceased, polymerization was carried out by conventional means. The product was pleasing in iridescent effects.

EXAMPLE 18

A n-butyl acrylate latex having a particle diameter of about 2,200 A. was dried slowly at 40° C. under controlled atmospheric conditions in order to produce partially dried iridescent material having a water content of less than 20% by weight. After dehydration of the material by dipping it in methyl alcohol, the material was incorporated in a mixture of diallyl phthalate and dibutyl adipate, and polymerization was carried out as previously described. The product was pleasing in iridescent effects.

EXAMPLE 19

A methyl methacrylate-butadiene copolymer latex having a particle diameter of about 2,000 A. was used in obtaining dehydrated iridescent material according to the preceding examples by dipping the latex in ethylene glycol. The material was then incorporated in a mixture of methyl methacrylate monomer and diallyl phthalate monomer and polymerization was carried out under standard conditions. The iridescent effect of the product was pleasing.

EXAMPLE 20

A 50 part methyl methacrylate-50 part (by weight) ethyl acrylate copolymer suspension having a uniform particle size (2500 A.) was placed in a glass container and allowed to stand quietly at 30° C. After iridescent color became observable, water was slowly evaporated from the suspension. Evaporation was discontinued when the water content of the suspension was reduced to about 1% by weight. The resulting material was slightly opaque and iridescent flecks were observable on its surface. After dehydration of the iridescent material by dipping in glycerin, the material was immersed in an unsaturated polyester and styrene mixture. Polymerization was carried out by conventional means. The product was pleasing in both transparency and iridescent effects.

EXAMPLE 21

A 60 part methyl methacrylate-40 part (by weight) ethyl acrylate copolymer suspension having a uniform particle size (3000 A.) was placed in a glass container and allowed to stand quietly at 60° C. After iridescent color became observable, water was slowly evaporated from the suspension at 60° C. under controlled atmospheric conditions. Evaporation was discontinued when the water content of the suspension was reduced to about 1% by weight. The resulting material was slightly opaque and iridescent flecks could be seen on its surface. After dehydration of the iridescent material by dipping in glycerin, the material was immersed in an unsaturated polyester and styrene monomer mixture. Polymerization was carried out according to conventional means. The product was pleasing in both transparency and iridescent effects.

EXAMPLE 22

A non-film-forming styrene-divinyl benzene copolymer latex having a uniform particle size of about 2,200 A. in diameter was placed in a glass container and allowed to stand quietly. After iridescent color became observable, the suspension was slowly dried by evaporation of water at 60° C. under a controlled atmosphere. Drying was ceased when the water content of the latex suspension was reduced below 1% by weight. The dried material was white, opaque and chalky. It had iridescent color on its surface and was fragile in nature. The material was immersed in methyl alcohol for further dehydration. After removal of excess methyl alcohol the material was immersed in a mixture of styrene monomer and methyl methacrylate monomer. During immersion the particles began to redisperse from the surface of the dehydrated material. The mixture of monomers became turbid, and correspondingly, the iridescent color disappeared.

EXAMPLE 23

The procedure of Example 7 was repeated and an ethylene glycol-treated material having elastic properties and a dominant green iridescent color was obtained. This material was immersed in an ethyl Cellosolve to remove the ethylene glycol and was thereafter immersed in styrene monomer containing as a catalyst, 0.5% benzoyl peroxide. Polymerization was carried out as previously described. The product thus produced revealed beautiful iridescence of a longer wave length than that of the products obtained in the preceding examples. In this case, the refractive index of the surrounding material was higher than that of the compacted latex.

We claim:

1. A stabilized, light-reflecting iridescent polymeric material comprising:
 a three-dimensional, closely-packed regularly-arranged structure of uniform polymeric microspheres;
 (a) said microspheres
  (1) originating from a polymeric latex characterized by film-forming properties such that the latex particles, when dried below 60° C., form on a substrate a transparent or semi-transparent film which can be peeled intact from the substrate, and
  (2) having a particle diameter in the range of 1,000–4,500 A., the uniformity of the individual particles being such that at least 80% of the mass of particles has a particle size within ±10% of the average particle size of the mass, and
 (b) said structure having been stabilized by surrounding said microspheres with a polymeric material, said material
  (1) having no measurable solubilizing effect on said microspheres, and
  (2) having a refractive index differing from that of the microspheres in absolute value to the extent of up to 0.1 to provide optical discontinuity.

2. The light reflecting iridescent polymeric material according to claim 1 wherein the polymeric latex having film-forming properties is a styrene-butadiene latex.

3. A method of making a stabilized light-reflecting iridescent polymeric material comprising:
 (a) maintaining a colloidally stable polymeric latex, characterized by film forming properties such that the latex particles, when dried below 60° C., form on a substrate a transparent or semi-transparent film which can be peeled intact from the substrate, in a quiescent state until iridescence is observed, whereby the particles of the latex become compacted and regularly arranged, said latex
  (1) consisting of substantially uniform particles having an average particle diameter in the range of 1,000–4,500 A., the uniformity of the individual particles being such that at least 80% of the mass of particles has a particle size within ±10% of the average particle size of the mass, and
  (2) having a water content of 50 to 80% by weight;
 (b) removing water from said compacted latex while maintaining the state of quiescence until the water content is reduced to 1–20% by weight;
 (c) adding to the resulting dehydrated regularly arranged compacted structure a water-miscible inert organic liquid, whereby the residual water is removed from the compacted structure;
 (d) surrounding the particles of the compacted structure with a polymerizable material, said material
  (1) having no measurable solubilizing effect on said microspheres, and
  (2) forming on polymerization a polymer having a refractive index differing from that of said particles in absolute value to the extent of up to 0.1 to provide optical discontinuity in the final product; and
 (e) polymerizing the material surrounding the particles to form a stabilized light-reflecting polymeric material exhibiting intense color caused by optical interference phenomena.

4. A method according to claim 3 wherein the water-miscible organic liquid is removed by directly replacing it with the polymerizable material used to surround the particles.

5. A method according to claim 4 wherein the polymerizable material used to replace the water-miscible organic liquid causes swelling of the particles of the compacted structure without destroying their regular arrangement and said polymerizable material is polymerized after the swelling ceases.

6. A method according to claim 3 wherein the water-miscible organic liquid is replaced by an inert non-volatile organic liquid and the regularly arranged compacted structure is
   (a) separated from said inert non-volatile organic liquid;
   (b) coated with a water soluble high polymer having low permeability;
   (c) dried;
   (d) immersed in the polymerizable material; and
   (e) stabilized by polymerization of the polymerizable material.

7. A method according to claim 6 wherein the non-volatile organic liquid used to replace the water-miscible organic liquid causes swelling of the particles of the compacted structure without destroying their regular arrangement and the compacted structure is separated from said non-volatile liquid after the swelling ceases.

8. A method according to claim 3 wherein the film-forming polymeric latex is a styrene-butadiene latex.

9. A method according to claim 3 wherein the colloidal stability of the latex in the quiescent state is such that the addition of 5 cc. of a 0.5% aqueous solution of $CaCl_2$ to 100 ml. of said latex does not cause coagulation.

10. The light-reflecting iridescent polymeric material according to claim 1 wherein the polymeric latex having film-forming properties is a butadiene copolymer latex.

References Cited

UNITED STATES PATENTS

| | | | |
|---|---|---|---|
| 3,349,046 | 10/1967 | Abell et al. | 260—2.5 |
| 3,412,177 | 11/1968 | Griffith | 260—881 |
| 3,475,516 | 10/1969 | Bauer et al. | 260—876 |
| 3,575,913 | 4/1971 | Meier | 260—29.7 |

JOSEPH L. SCHOFER, Primary Examiner

W. F. HAMRUCK, Assistant Examiner

U.S. Cl. X.R.

260—879, 881, 884, 885, 886